US008156021B2

(12) United States Patent  
Lindauer et al.

(10) Patent No.: US 8,156,021 B2  
(45) Date of Patent: Apr. 10, 2012

(54) DATA PROCESSING SYSTEM AND METHOD FOR TRANSMITTING OF PAYMENT ADVICE DATA

(75) Inventors: Friedrich Lindauer, Sandhausen (DE); Dietmar Engelmann, Sinshiem (DE)

(73) Assignee: SAP AG, Walldorf (DE)

( * ) Notice: Subject to any disclaimer, the term of this patent is extended or adjusted under 35 U.S.C. 154(b) by 1880 days.

(21) Appl. No.: 10/875,732

(22) Filed: Jun. 25, 2004

(65) Prior Publication Data

US 2005/0021464 A1    Jan. 27, 2005

(30) Foreign Application Priority Data

Jun. 30, 2003    (EP) ..................................... 03014813

(51) Int. Cl.  
*G06Q 40/00* (2012.01)
(52) U.S. Cl. ............... 705/35; 705/38; 705/39; 705/40; 705/42
(58) Field of Classification Search .................... 705/35, 705/38, 39, 40, 42  
See application file for complete search history.

(56) References Cited

U.S. PATENT DOCUMENTS

| | | | | |
|---|---|---|---|---|
| 5,465,206 A | * | 11/1995 | Hilt et al. ......................... | 705/40 |
| 5,970,475 A | * | 10/1999 | Barnes et al. .................... | 705/27 |
| 6,070,150 A | * | 5/2000 | Remington et al. ............. | 705/34 |
| 2002/0046162 A1 | * | 4/2002 | Sakashita et al. ............... | 705/39 |
| 2002/0082990 A1 | * | 6/2002 | Jones .............................. | 705/40 |
| 2002/0120570 A1 | * | 8/2002 | Loy ................................. | 705/40 |
| 2003/0220858 A1 | * | 11/2003 | Lam et al. ....................... | 705/35 |
| 2004/0044620 A1 | * | 3/2004 | Iversen ........................... | 705/40 |
| 2004/0049459 A1 | * | 3/2004 | Philliou et al. .................. | 705/40 |
| 2004/0181493 A1 | * | 9/2004 | Cross et al. ..................... | 705/75 |
| 2007/0061260 A1 | * | 3/2007 | deGroeve et al. ............... | 705/44 |

OTHER PUBLICATIONS

W3C Publishes Web Services Description Language (WSDL) Version 1.1 by Robin Cover, Mar. 15, 2001.*  
Business-to-Business EIPP: Presentment Models and Payment Options, Part One: Presentment Models, by Council for Electronic Billing and Payment, Jan. 2001.*  
Joseph M. Chiusano, "Web Services Security and More: The Global XML Web Services (GXA) Initiative," [Online], retrieved from the Internet on Sep. 16, 2005: http://xml.coverpages.org/ChiusanoGXA.pdf, Mar. 17, 2003, pp. 0-63.

(Continued)

*Primary Examiner* — Shahid Merchant  
(74) *Attorney, Agent, or Firm* — Finnegan, Henderson, Farabow, Garrett & Dunner, L.L.P.

(57) ABSTRACT

Systems and methods for transmitting payment advice data from a payment computer system to a payee computer system are provided. An exemplary method may include generating a payment order and payment advice data. The method may further include generating a unique identifier for the payment order, transmitting the payment order and the unique identifier to a banking computer system, and transmitting the payment advice data and the unique identifier to a central computer system. The method may further include sending bank statement data indicative of an execution of the payment order to the payee computer system, where the bank statement data includes the unique identifier of the payment order. The method may further include storing the payment advice data and the unique identifier in the central computer system, in response to a receipt of the bank statement data by the payee computer system, and requesting the payment advice data from the central computer system using the unique identifier as a key.

20 Claims, 3 Drawing Sheets

OTHER PUBLICATIONS

Eduard Heindl, "SOAP, nur ein neuer XML—Dialekt?," [Online], retrieved from the Internet on Jun. 16, 2005: http://heindl-internet.de/eduard-heind_l/SOAP.ppt, Dec. 10, 2002, pp. 1-29.

Gerald Hoppe, "mySAP Technology—Infrastruktur für offene E-Business-Umgebungen—Integration über Unternehmensgrenzen hinweg" SAP INFO THEMA, [Online], retrieved from the Internet on Sep. 16, 2005: http://www.sapinfo.net/resources/RFILE_101283cdbae1d98ecd.pdf, May 2005, pp. 1-2.

PCT International Preliminary Report and Written Opinion, mailed Jan. 12, 2006, (7 pages).

* cited by examiner

DATA PROCESSING SYSTEM AND METHOD FOR TRANSMITTING OF PAYMENT ADVICE DATA

FIELD OF THE INVENTION

The present invention relates to the field of computer systems, and more particularly to systems and methods for processing of payment advice data.

BACKGROUND OF THE INVENTION

A payment advice note generally contains the incoming payment details required for assigning and clearing the relevant open item. Typically, payment advice note headers contain the payment amount, payment date, and other information about the payment. The advice items contain information on the paid items. They also contain information used for identification purposes such as document number, reference number, billing document number, customer reference number, and so on. Payment advice notes are used during payment clearing to search for and assign open items automatically. Payment advice notes are also referred to as remittance advice notes.

Typically, payment advice notes are provided from a payer to a payee by means of regular mail, e-mail or by fax. Among other disadvantages, these conventional transmission methods have the disadvantage that the data contained on the payment advice notes needs to be manually re-entered into the payee's financial computer system. Payment advice notes are not only received for incoming payments but also for outgoing payments. When a direct debiting procedure is used, the payment is initiated by the payee rather than by the payer. In this instance payment advice notes are provided from the payee to the payer.

Payment advice notes may also be transmitted by means of an electronic message, such as EDIFACT. One of the problems associated with this is that the payer needs to know the exact address of the processing entity of the financial processing system of the payee which is to receive the payment advice note in order to enable automatic processing. Another problem associated with this approach is that the payer needs to be aware of the exact format used by the processing entity of the payee's financial computer processing system.

Accordingly, there is a need for an improved transmission method and system for payment advice data.

SUMMARY OF THE INVENTION

The present invention provides for a method and data processing system which enables transmission of payment advice data from a payer computer system to a payee computer system through the intermediary of a central computer system using a unique identifier as a key. The unique identifier may be communicated from the payer computer system to the payee computer system through a financial transaction network including at least one banking computer.

The payment order, which may be sent from the payer computer system to the banking computer system, may include the unique identifier as a reference. The reference may be included in the bank statement which the payee receives from its bank.

The payment advice data and the unique identifier may be transmitted from the payer computer system to a central computer system where the payment advice data may be stored in a database. The payee computer system can access the payment advice data by means of the unique identifier contained in the bank statement. The payment advice data may be transmitted from the central computer system to the payee computer system where it may be processed to match the postings of the payee computer system. Alternatively, the payer may provide payment to the payee by means of a check. In this instance the unique identifier may be given in the reference field of the check document. By means of a check, the unique identifier may therefore be directly communicated from the payer to the payee without the intermediary of a banking computer system. Thus, a central computer system may be used as a hub for the payment advice data. The payment computer system may send the payment advice data to the same central computer system without knowing any specifics of the payee computer system and its financial processing software.

Likewise, the payee computer system can request the payment advice data when the payment advice data is required by the work flow which is implemented in the payee's financial processing. The asynchronous operation of the payment computer system and the payee computer system as far as the transmission of the payment advice data is concerned may be based on the usage of a unique identifier. In one embodiment, a globally unique identifier may be used.

In accordance with an embodiment of the invention, the creation time of the payment advice data file may be used as a basis for the generation of the unique identifier. Additionally or alternatively, a payer and/or payee company code, account type, account number and/or other information may be used for the creation of the unique identifier. Various exemplary algorithms for creating a unique identifier in accordance with the universal unique identifier (UUID) standards definition are as such known from http://www.opengroup.org/on line-pubs/9629399/apdxa.htm. Another example is Microsoft's GUID Structure Definition (http://msdn.microsoft.com/library/default.asp?url=/library/en-us/cpref/html/frlrfsystemguidclasstopic.asp) the entirety of which is herein incorporated by reference.

In accordance with another embodiment of the invention, the transmission of the payment advice data from the central computer system to the payee computer system may be implemented as a web service in accordance with the web services architecture (http://www.w3.org/TR/ws-arch/#wsdl), the entirety of which is herein incorporated by reference. In this instance, the reference of the payment order may include an identification of the web server in addition to the unique identifier.

Like the unique identifier, the identifier for the web service may be included in the bank statement. This enables the payee computer system to access a web service directory in order to obtain a description of the payment advice web service. By way of a non-limiting example, the description of the web service may be contained in a WSDL file which the payee computer system may receive from the web service directory. The WSDL file may contain an XML schema definition which may be the basis for generating an XML request by the payee computer system in order to obtain the payment advice data from the central computer system.

In accordance with another embodiment of the invention, the web service provided by the central computer system may be registered in the web services directory in accordance with the universal description, discovery and integration of web services (UDDI) specification (http://www.uddi.org/specification.html), the entirety of which is incorporated herein by reference.

BRIEF DESCRIPTION OF THE DRAWINGS

It is to be understood that both the foregoing general description and the following detailed description are exemplary and explanatory only and are not restrictive of the invention, as claimed. The accompanying drawings, which are incorporated in and constitute a part of this specification, illustrate several embodiments of the invention and together with the description, serve to explain the principles of the invention. In the drawings:

DETAILED DESCRIPTION

Figure 1:
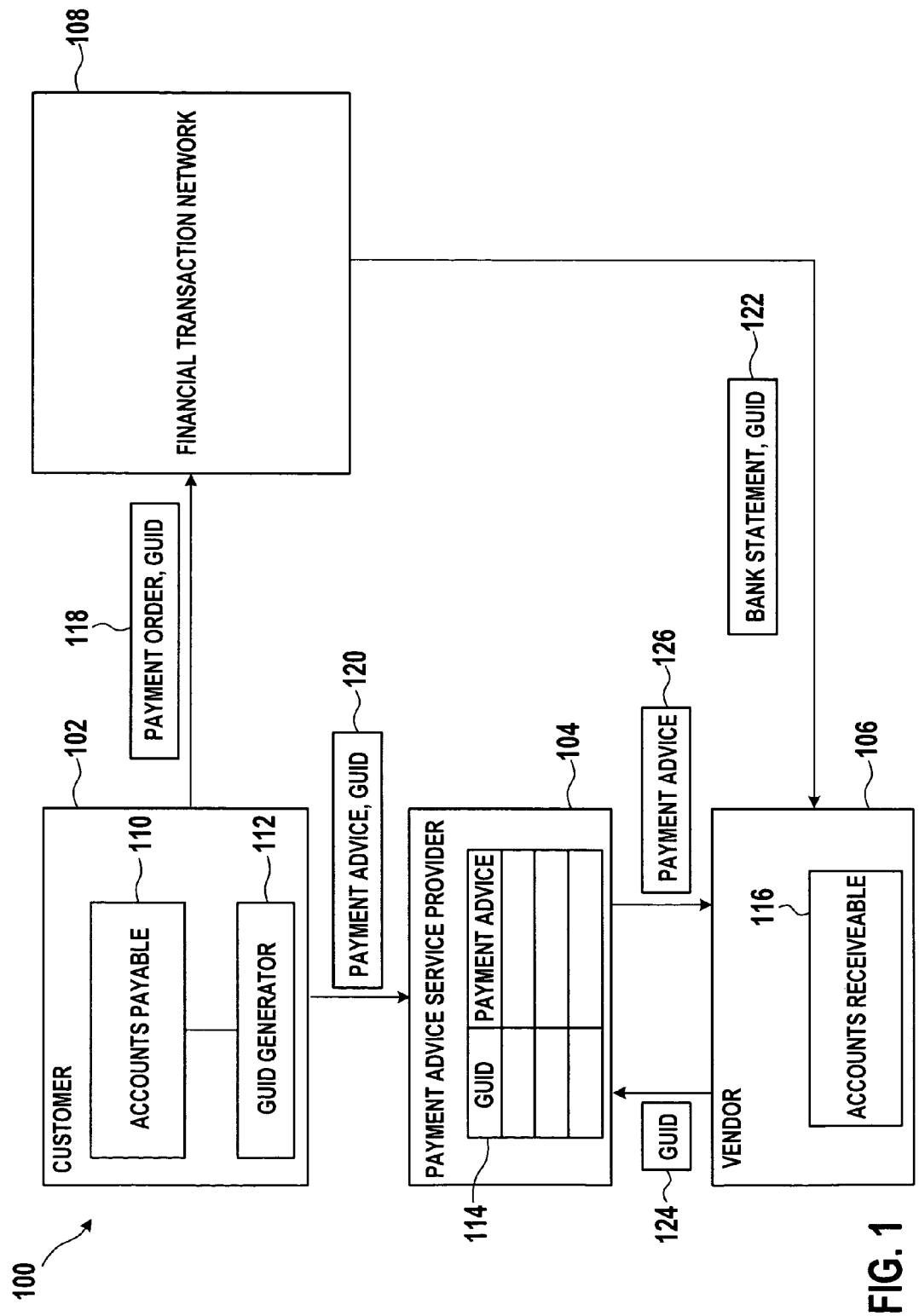
FIG. 1 is a block diagram of an embodiment of a data processing system, consistent with certain aspects of the present invention.

FIG. 1 shows data processing system 100. Data processing 100 may include a computer system 102, a computer system 104, a computer system 106, and a financial transaction network 108.

Computer system 102 may belong to a customer, that wishes to make a payment to a vendor. Computer system 102 may have an accounts payable application component 110 which may be coupled to a globally unique identifier (GUID) generator component 112. GUID generator component 112 may implement a method for generating of identifiers which are unique in time and space.

In one embodiment, this may be done on the basis of the creation time and date and/or other information such as the company code of the payee, i.e., the vendor in the example considered here, account type, and account number. Alternatively, a universal unique identifier (UUID) in accordance with the UUID specification may be generated by GUID generator component 112.

Computer system 102 can communicate with financial transaction network 108 and computer system 104 by means of a suitable protocol, such as the hypertext transfer protocol.

Computer system 104 may have a database 114 for storing of payment advice data received from computer system 102 and for storing of the GUIDs of the payment advice data. The payment advice data, or a pointer to the payment advice data, may be stored in a data field of the database table; the GUID being assigned to the payment advice data may be stored in a key field of the database table for retrieval of the payment advice data.

Computer system 106 may have an accounts receivable application component 116. Accounts receivable application component 116 may serve to process bank statement data and payment advice data received from financial transaction network 108 and computer system 104, respectively.

Financial transaction network 108 may have at least one banking computer for the execution of a payment order received from computer system 102 and for providing a bank statement to vendor computer system 106.

For example, the accounts payable application component 110 may record and manage accounting data for all vendors. It may also be an integral part of the customer's purchasing system which may be implemented by computer system 102. Deliveries and invoices may be managed according to vendors. The purchasing system may automatically trigger postings in response to the operative transactions. In the same way, the purchasing system can supply a cash management application component with figures from invoices in order to optimize liquidity planning.

Payables may be paid with the accounts payable application component 110. This may support all standard payment methods (such as checks and transfers) in printed form as well as in electronic form (data medium exchange on disk and electronic data interchange) as well as country-specific payment methods.

Postings made in accounts payable application component 110 may be simultaneously recorded in a general ledger where different general ledger accounts may be updated based on the transaction involved (payables and down payments, for example). Further, the general ledger may comprise due date forecasts and other standard reports that can be used to monitor open items.

The accounts receivable application component 116 may record and manage accounting data of all customers. It may be an integral part of a sales management system implemented by computer system 106.

For example, all postings in accounts receivable application component 116 may also be recorded directly in a general ledger of computer system 106. Different general ledger accounts may be updated depending on the transaction involved (for example, receivables, down payments, and bills of exchange). The sales management system may contain a range of tools that can be used to monitor open items, such as account analyses, alarm reports, due date lists, and a flexible dunning program. The correspondence linked to these tools can be individually formulated to suit various accounting requirements. This may also be the case for payment notices, balance confirmations, account statements, and interest calculations.

Accounts receivable application component 116 may implement a range of tools available for documenting the transactions that occur in accounts receivable, including balance lists, journals, balance audit trails, and other standard reports. When drawing up financial statements, the items in foreign currency may be re-valued, customers who are also vendors may be listed, and the balances on the accounts may be sorted by remaining life. For example, accounts receivable application component 116 can also provide the data required for effective credit management, as well as important information for the optimization of liquidity planning.

The Internet may be used as a communication medium for communication between the computer system 102, computer system 104 and computer system 106. The Internet can also be used as a communication medium between computer system 102, financial transaction network 108 and computer system 106. However, for security reasons EDI or another secure communication path may be used, for example, at least for sending of the payment order from computer system 102 to financial transaction network 108.

In operation, accounts payable application component 110 may generate a payment order for providing payment for a number of open payment items to a payee, i.e., a vendor. Accounts payable application component 110 may invoke GUID generator component 112, which in response, may provide a GUID. This GUID may be assigned to the payment order which has just been created by accounts payable application component 110.

The payment order and its GUID may be transmitted as file 118 from computer system 102 to financial transaction network 108. For example, the GUID may be entered into a reference data field in an electronic payment order form which is supported by financial transaction network 108.

In addition, accounts payable application component 110 may generate payment advice data for the payment order. The payment advice data and the GUID of the payment order may be transmitted from computer system 102 to computer system 104 as file 120. For example, file 120 may be an XML file, which is sent by means of a hypertext transfer protocol (HTTP) POST or PUT request to computer system 104.

In response, computer system 104 may store the payment advice data in a data field of database 114 and GUID in a key field of database 114 for later retrieval of the payment advice data using the GUID as a key. Alternatively, the payment advice data may itself not be stored in database 114, but a pointer to a document containing the payment advice data may be stored in computer system 104.

By means of financial transaction network 108, the payment order, which is received as file 118, may be processed. As a result, payment may be provided to the vendor and a bank statement may be generated. The bank statement data and the GUID indicated in the reference field of the payment order may be transmitted as file 122 from financial transaction network 108 to computer system 106.

This may invoke accounts receivable application component 116. Accounts receivable application component 116 may send a request 124 containing the GUID to computer system 104. In response, computer system 104 may perform a database query in database 114 using the GUID as a key. This way the payment advice data of the payment order to which the GUID is assigned may be retrieved from database 114 by computer system 104. The payment advice data may be transmitted from computer system 104 to computer system 106 as response 126 containing the payment advice data.

Request 124 may be a HTTP request, which is sent from computer system 106 to computer system 104 via the Internet. Likewise, response 126 may be a HTTP response which is also sent via the Internet.

In response to the receipt of response 126, accounts receivable application component 116 may clear the open payment items indicated in the payment advice data for which payment has been received in accordance with the bank statement data contained in file 122.

Figure 2:
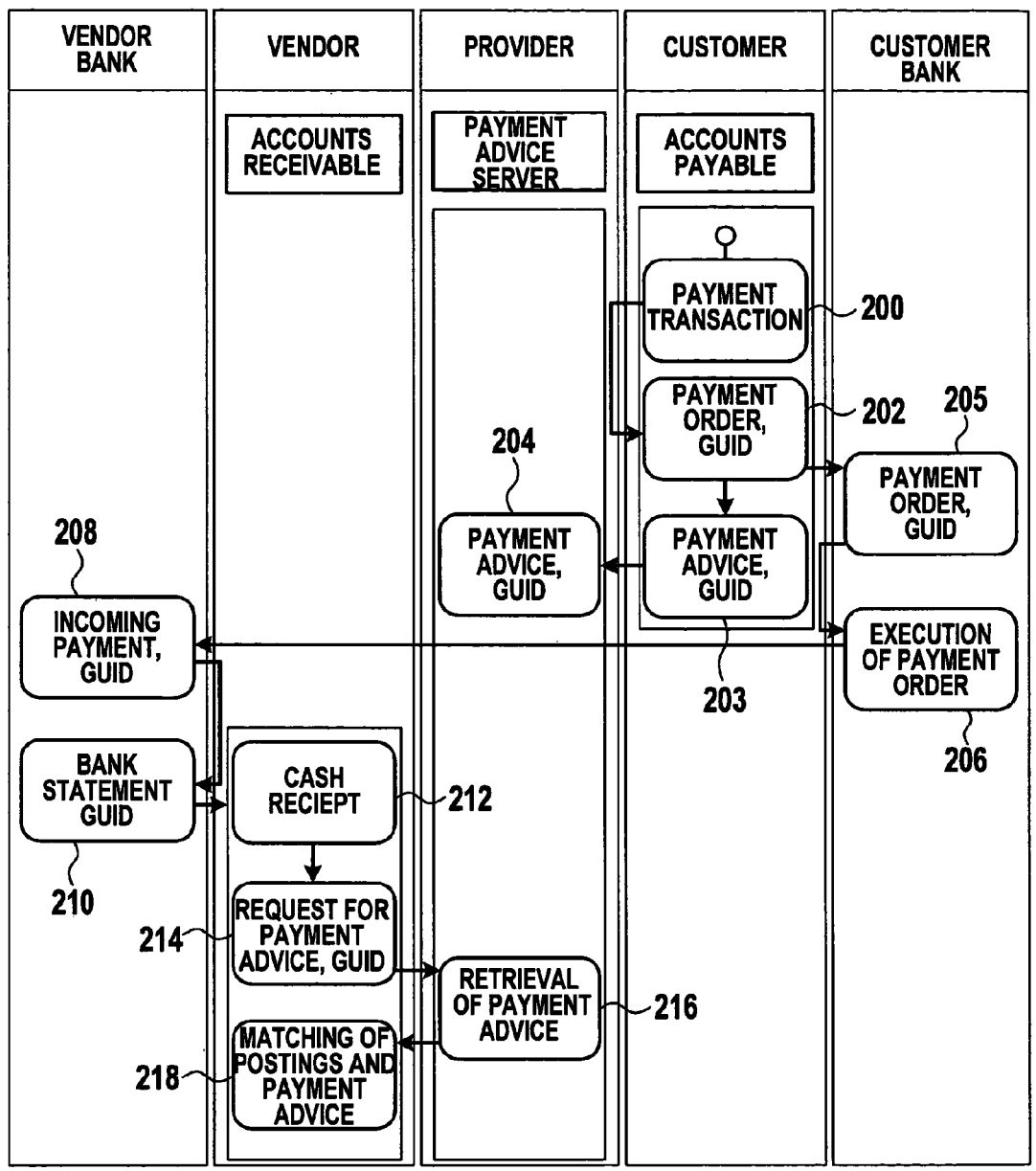
FIG. 2 is a block diagram illustrating the flow of information for processing of a payment, consistent with certain aspects of the present invention.

FIG. 2 is a block diagram illustrating the flow of information for the processing of a payment and the payment advice data by way of example. In the example considered here, a customer bank and a vendor bank may be involved for providing the payment to the vendor.

In step 200, a payment transaction may be initiated by an accounts payable application component 110 of the customer computer system (102 of FIG. 1, for example). This way a payment order and a GUID for identification of the payment order may be generated in step 202. For example, the GUID may be entered into a reference data field of a standardized electronic payment order format to create a payment order file.

The payment order file containing the GUID may be transmitted to the computer system of the customer's bank in step 205. In response, the customer's bank computer system may execute the payment order in step 206.

Further, a payment advice note may be generated by the accounts payable application component 110 in step 203. The payment advice note may include details of the payment items included in the payment and the GUID in order to unequivocally identify the payment.

The payment advice note and the GUID may be transmitted from the customer computer system (102 of FIG. 1, for example) to provider computer system (104 of FIG. 1, for example) in step 204. Provider computer system may store the payment advice note and the GUID for later retrieval. The Internet may be used as a communication medium between customer computer system and provider computer system for the transmission of the payment advice note and the GUID.

For example, customer computer system may send payment advice note and GUID as a HTTP POST request to provider computer system.

The execution of the payment order in step 206 may be communicated from the customer's bank computer system to vendor's bank computer system where the incoming payment may be entered.

This may include transmission of the data which has been entered into the reference data field of the payment order, i.e., the GUID. The incoming payment may be processed in step 208 by the vendor's bank computer system. In step 210, a bank statement may be generated, which may include the reference data field content, i.e., the GUID.

The bank statement data, including the GUID, may be transmitted from the vendor's bank computer system to vendor computer system (106 of FIG. 1, for example) where the cash receipt may be processed by an accounts receivable application component in step 212.

In step 214, a request for payment advice data may be generated by the accounts receivable application component 116. This request may contain the GUID. The request may be sent from vendor computer system to provider computer system. In response to receipt of the request, provider computer system may retrieve the payment advice note which may have been previously stored in step 204. This may be done in step 216. The payment advice note may then be transmitted from provider computer system (102 of FIG. 1, for example) to vendor computer system (106 of FIG. 1, for example). In response to receipt of the payment advice note from provider computer system, accounts receivable application component 116 of vendor computer system may perform a matching of postings and the payment advice data contained in the payment advice note in step 218.

Figure 3:
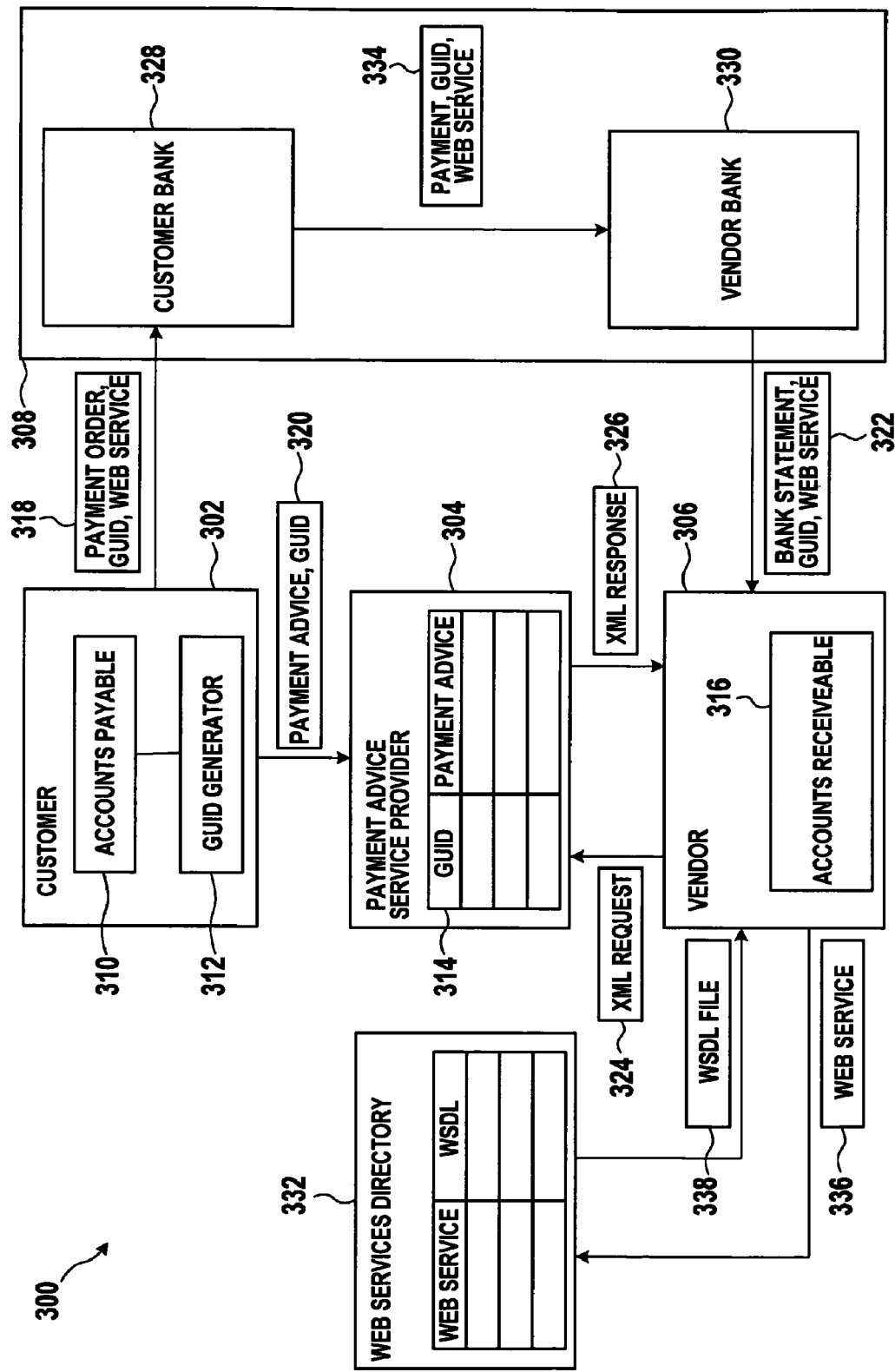
FIG. 3 is a block diagram of an alternative data processing system using web services, consistent with certain aspects of the present invention.

FIG. 3 shows an alternative embodiment for a data processing system for transmitting of payment advice data. Elements of the embodiment of FIG. 3 which are similar to elements of FIG. 1 have been designated by like reference numerals having added 200.

In the embodiment of FIG. 3, a financial transaction network 308 may have a computer system 328 of the customer's bank and a computer system 330 of vendor's bank.

The payment advice service provided by a computer system 304 may be implemented as a web service. The web service may be registered in a web services directory 332 in accordance with the UUID specification. Web services directory 332 may have an entry for the payment advice web service provided by computer system 304 comprising a web service identifier and a WSDL file containing a description of the web service.

The web service identifier may be a key for access to the WSDL file. The WSDL file may comprise an XML schema definition for the communication between the service requestor, i.e., computer system 106, and the service provider of the web service, i.e., computer system 304.

In operation, file 318 may be transmitted from computer system 102 to computer system 328. Like file 118 (FIG. 1) file 318, may contain a payment order and a GUID. In addition, file 318 may contain the web service identifier for identification of the web service provided by computer system 304. The web service identifier may also be entered in the reference data field of the electronic payment order form.

Computer system 328 may process file 318 and provide payment to the vendor bank. Computer system 328 may generate file 334 containing an indication of the payment, the GUID for identification of the payment and the web service identifier. File 334 may be processed by computer system 330 of the vendor bank in order to provide file 322 containing a bank statement and the data of the reference data field, i.e., the GUID and the web service identifier. In response to receipt of the file 322 accounts receivable application component 316 of computer system 306 may be invoked. When the web service identifier contained in file 322 is received the first time by the accounts receivable application component 316, a request 336 may be sent from computer system 306 to web services directory 332. Request 336 may contain the web service identifier.

In response to request 336, web services directory 332 may retrieve the WSDL file of the payment advice web service using the web service identifier contained in request 336 as a key. The retrieved WSDL file may be transmitted from web services directory 332 to computer system 306 as file 338.

The XML schema definition contained in file 338 may be used by accounts receivable application component 316 to generate XML request 324 which may be transmitted from computer system 306 to computer system 304 by means of HTTP. In response, computer system 304 may generate an XML response 326 containing the payment advice data in compliance with the XML schema definition of the web service contained in the WSDL file 338. Hence, XML response 326 can be processed fully automatically by accounts receivable application component 316 without human interaction.

As an alternative, the web service can also be implemented as a PUSH service.

It is to be noted that computer system 304 can have the role of a central hub for providing the payment advice web service. Computer system 304 can service an unrestricted number of customer computer systems of the type of computer system 302 and it can also service an unrestricted number of vendor computer systems of the type of computer system 306. Using computer system 304 as a central hub, customers and vendors need not deal with the particulars of the financial processing systems of the involved parties. This is because the addressing which is used by data processing system 300 is generic as it relies on the GUID. In the implementation based on web services the payment advice data may be received by computer system 306 in a generic format as specified in the WSDL file 338.

It is to be noted that the present invention can also be used for a direct debiting procedure where the roles of payer and payee are interchanged, i.e., the payee initiates the payment rather than the payer. When a direct debiting procedure is used the payment advice data is received by the payee rather than by the payer.

Although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

What is claimed is:

1. A data processing system for transmitting of payment advice data, the data processing system comprising:
at least one payer computer system having means for generating a payment order and payment advice data, means for generating a unique identifier for the payment order, means for transmitting the payment order and the unique identifier to a banking computer system, and means for transmitting the payment advice data and the unique identifier to a central computer system;
the banking computer system having means for sending bank statement data indicative of an execution of the payment order to a payee computer system, the bank statement data comprising the unique identifier of the payment order;
the central computer system having means for storing the payment advice data and the unique identifier; and
the payee computer system having means for requesting the payment advice data from the central computer system by sending a request for the payment advice data to the central computer system in response to receipt of the bank statement data,
wherein the request comprises the unique identifier, and
wherein the central computer system uses the unique identifier as a key to retrieve the payment advice data corresponding to the unique identifier and transmits the payment advice data to the payee computer system.

2. The data processing system of claim 1, wherein the payment advice data comprises payment amount, payment date, and identification information.

3. The data processing system of claim 1, wherein the means for transmitting the payment order and the unique identifier is adapted to transmit a web service identifier to the banking computer system, the web service identifier is provided as part of the bank statement data, and the payee computer system is adapted to request web service description data from a web services directory in response to receipt of the bank statement data, and wherein the means for requesting the payment advice data from the central computer system is adapted to send a mark up language request for the payment advice data on the basis of a mark up language schema definition of the web service description data.

4. The data processing system of claim 3, wherein the mark up language is XML and the web service description data is a WSDL file.

5. A method of transmitting payment advice data from a payment computer system to a payee computer system, the method comprising:
generating a payment order and payment advice data;
generating a unique identifier for the payment order;
transmitting the payment order and the unique identifier to a banking computer system;
transmitting the payment advice data and the unique identifier to a central computer system;
sending bank statement data indicative of an execution of the payment order to the payee computer system, the bank statement data comprising the unique identifier of the payment order;
storing the payment advice data and the unique identifier in the central computer system; and
in response to a receipt of the bank statement data by the payee computer system, requesting the payment advice data from the central computer system by sending a request for the payment advice data to the central computer system,
wherein the request comprises the unique identifier, and
wherein the central computer system uses the unique identifier as a key to retrieve the payment advice data corresponding to the unique identifier and transmits the payment advice data to the payee computer system.

6. The method of claim 5, wherein the payment advice data comprises payment amount, payment date, and identification information.

7. The method of claim 5, further comprising:
transmitting a web service identifier together with the payment order to the banking computer system, including the web service identifier in the bank statement data; and
in response to the receipt of the bank statement data, requesting web service description data from a web services directory, wherein the request of the payment advice data from the central computer system is made using a mark up language schema definition of the web service description data.

8. The method of claim 7, wherein the mark up language is XML, the web services description data is a WSDL file, and hyper-text transfer protocol is used for requesting the payment advice data from the central computer system.

9. A computer system for initiating a payment, the computer system comprising:
    means for generating a payment order and payment advice data;
    means for generating a unique identifier for the payment order;
    means for transmitting the payment order and the unique identifier to a banking computer system; and
    means for transmitting the payment advice data and the unique identifier to a central computer system,
    wherein a payee computer system requests the payment advice data from the central computer system by sending a request for the payment advice data to the central computer system,
    wherein the request comprises the unique identifier, and
    wherein the central computer system uses the unique identifier as a key to retrieve the payment advice data corresponding to the unique identifier and transmits the payment advice data to the payee computer system.

10. The computer system of claim 9, wherein the means for generating the unique identifier is adapted to generate a universal unique identifier (UUID).

11. The computer system of claim 9, wherein the payment advice data comprises payment amount, payment date, and identification information.

12. A computer system for processing bank statement data, the computer system comprising:
    means for receiving bank statement data indicative of an execution of a payment order, the bank statement data comprising a unique identifier of the payment order;
    means for generating a request for the payment advice data, the request comprising the unique identifier;
    means for sending the request to a central computer system; and
    means for receiving the payment advice data from the central computer system, wherein the central computer system receives the payment advice data from a payer computer system.

13. The computer system of claim 12 further comprising means for requesting web service description data from a web services directory in response to receipt of the bank statement data, the bank statement data including a web service identifier, and wherein the means for generating the request is adapted to generate the request in accordance with a mark up language schema definition of the web service description data.

14. A computer system for communicating payment advice data between a plurality of payers and a plurality of payees, the computer system comprising:
    means for receiving payment advice data and a unique identifier being assigned thereto from each one of a plurality of payer computer systems;
    means for storing the payment advice data and the unique identifier;
    means for retrieving the payment advice data, using the unique identifier as a key in response to a receipt of a request for the payment advice data from anyone of a plurality of payee computer systems, the request comprising the unique identifier corresponding to the payment advice data; and
    means for sending the retrieved payment advice data to any one of the payee computer systems.

15. A computer readable storage medium storing a program for causing a computer to perform a method for initiating a payment, the method comprising:
    generating a payment order and payment advice data;
    generating a unique identifier for the payment order; and
    invoking a transfer protocol for sending the payment order and the unique identifier to a banking computer system and for sending the payment advice data and the unique identifier to a central computer system,
    wherein a payee computer system requests the payment advice data from the central computer system by sending a request for the payment advice data to the central computer system,
    wherein the request comprises the unique identifier, and
    wherein the central computer system retrieves the payment advice data corresponding to the unique identifier and transmits the payment advice data to the payee computer system.

16. The computer readable storage medium of claim 15, wherein the method for initiating the payment further comprises invoking the transfer protocol for sending a web service identifier to the banking computer system together with the payment order and the unique identifier.

17. The computer readable storage medium of claim 15, wherein the method for initiating the payment further comprises generating the unique identifier as a universal unique identifier (UUID).

18. A computer readable storage medium storing a program for causing a computer to perform a method for processing bank statement data, the method comprising:
    receiving bank statement data indicative of an execution of a payment order, the bank statement data comprising a unique identifier of the payment order;
    generating a request for payment advice data, the request comprising the unique identifier;
    invoking a transfer protocol for sending the request to a central computer system; and
    receiving the payment advice data from the central computer system, wherein the central computer system receives the payment advice data from a payer computer system.

19. The computer readable storage medium of claim 18, wherein the method for processing bank statement data further comprises matching posting data and the payment advice data received from the central computer system.

20. The computer readable storage medium of claim 18, wherein the method for processing bank statement data further comprises requesting web service description data from a web services directory in response to receipt of the bank statement data, the bank statement data comprising a web service identifier, wherein the request is generated in accordance with a mark up language schema definition of the web service description data.

* * * * *